March 15, 1927. 1,621,408
M. B. HOLSTEIN
SIGNALING ATTACHMENT FOR STEERING WHEELS
Filed Nov. 13, 1925
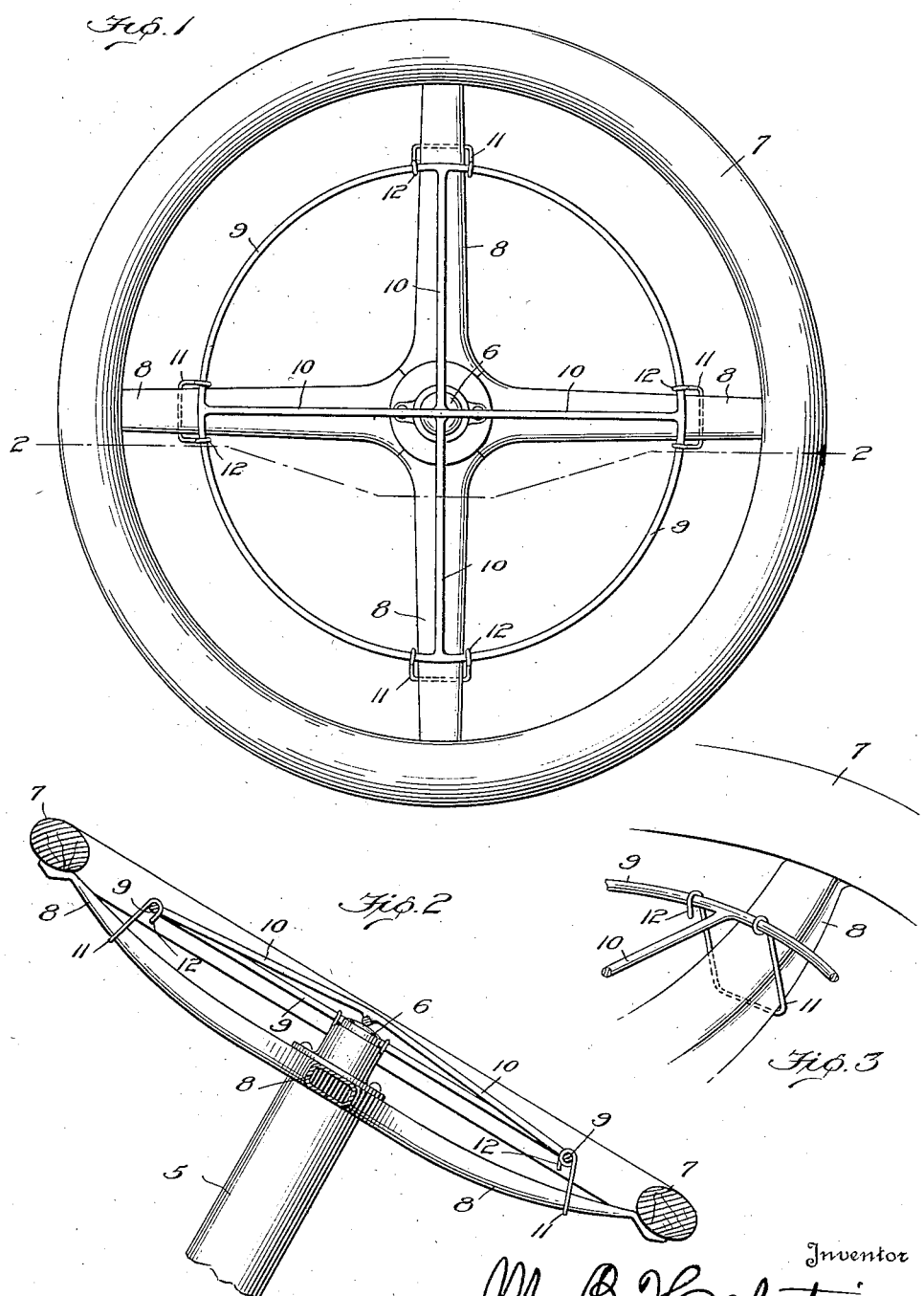

Patented Mar. 15, 1927.

1,621,408

UNITED STATES PATENT OFFICE.

MICHAEL B. HOLSTEIN, OF RICHLAND, PENNSYLVANIA.

SIGNALING ATTACHMENT FOR STEERING WHEELS.

Application filed November 13, 1925. Serial No. 68,899.

My invention relates to electrical circuit makers and breakers, but has reference more particularly to a hand-operated circuit controller mounted upon the steering wheel of an automobile, motor boat, or other power driven vehicle, for the purpose of sounding an alarm or signal when required or desired.

One object of this invention is the production of novel and efficient means for actuating signals of the character indicated, without the necessity of removing the driver's hands from the steering wheel.

A further object of this invention is the production of signal controllers such as aforesaid, which are of simple, inexpensive and durable construction, reliable and efficient in operation and capable of ready attachment to steering wheels generally as an accessory.

With the foregoing and other objects in view, and certain practical advantages readily apparent to persons skilled in the art to which this invention relates, the device will now be particularly described and then pointed out in the claims following.

In the accompanying drawings which form part of this application for Letters Patent, and whereon corresponding numerals indicate like parts in the several views:

Figure 1 is a plan view of an automobile steering wheel with my invention attached;

Figure 2 is a transverse sectional view, taken on the irregular section line 2—2 of Figure 1, through a steering wheel, a steering post, and through my improved attachment as applied in operative position; and Figure 3 is a fragmentary perspective view of a part of my invention showing one of many means for attaching the same to a steering wheel.

Reference being had to the drawings and numerals thereon, 5 indicates an ordinary automobile steering post, having therein ordinary make and break electrical switch members (not shown) and ordinary spring-actuated means for holding the switch members normally disconnected.

Surmounting one of said switch members, as usual, is a longitudinally reciprocating, spring-pressed plunger 6, by means of which the electrical circuit may be closed and the signal sounded.

Ordinarily the driver must actually remove one hand from the steering wheel before he can expect to reach and depress plunger 6 for the purpose of sounding an alarm, and obviously such removal of the driver's hand is a dangerous and sometimes a serious matter.

The numeral 7 indicates a steering wheel and 8 the radial supporting spokes thereof.

Surmounting the radial supports 8 of the wheel 7, and concentrically positioned with relation to the latter, is a relatively stiff annular operating-ring 9, within easy reach of the thumbs of a driver when both hands firmly clutch the steering wheel. This operating ring 9 is crossed diametrically by spokes 10, 10, which intersect at center of the structure immediately above the spring-pressed plunger 6 aforesaid upon the surface of which they rest in contact. The said spokes are permanently secured together at their centers, and at their ends are similarly secured to the operating ring 9, as by brazing, welding, or soldering; or, if desired, both ring 9 and spokes 10 may be stamped bodily from sheet steel or otherwise formed as an integral, unitary structure.

There may be two or more of these spokes 10, including four as shown by the drawings, arranged and positioned in the same vertical planes occupied by the wheel supports 8 immediately thereunder. Depending from the operating ring 9, at equidistant points, are wire yokes or bails 11, each of which passes beneath its respective wheel support 8 and again rises upon the opposite side thereof to the horizontal plane occupied by ring 9 to which it is further secured by means of a hooked terminal 12 as shown in detail by Figure 3. The yoke or bail illustrated and described is herein employed merely as an exemplification of numerous fastening means that may be employed without departing in the least from the spirit of this invention, it being necessary only that the agency by which operating ring 9 is secured in position upon the supports 8 or their equivalent, should be such as to freely allow a vertical depression of said ring, and the return thereof to its normal position without liability of accidental disengagement. It is also desirable that this fastening means be such as to render the device readily attachable by either skilled or unskilled persons, and as readily removable after the open hook terminals 12 have been unhooked.

This being a description of the invention in one operative form of construction, its use and operation will be quite obvious and need not be herein dwelt upon at length. It will be noted however, that as shown the spokes 10 and their operating ring 9 are retained in their normal elevated position by agency of the spring-pressed plunger 6, and it may also be noted that the intersecting spokes 10, resting normally upon the end of plunger 6, may be sufficiently bent upward or downward, in adjusting the attachment originally, thereby allowing and compensating for some slight variation in the length of projecting plungers such as 6 upon different makes of steering wheels.

When applied in operative position as shown, it will be apparent that the ring 9 may readily be reached at any point by the thumb or thumbs of a driver without the necessity of removing a hand from the steering wheel or relinquishing his grip upon it.

Having thus described my invention, what I now claim and desire to secure by Letters Patent is:

1. The combination with a steering wheel for motor vehicles, of a signal-actuating plunger carried by said wheel and an operating lever pivoted at one end upon the steering wheel and directly contacting with said plunger at its point of crossing the latter and terminating adjacent the inner periphery of the steering wheel.

2. The combination with a steering wheel for motor vehicles, of a signal-actuating plunger carried by said wheel, a plurality of intersecting operating levers directly contacting with said plunger at their points of intersection, and means for connecting the ends of said levers at points adjacent the inner periphery of the steering wheel.

3. The combination with a steering wheel for motor vehicles, of a signal-actuating plunger carried by said wheel, a plurality of intersecting operating levers directly contacting with said plunger at their points of crossing same, and a ring connecting the ends of said levers adjacent the inner periphery of the steering wheel.

4. The combination with a steering wheel for motor vehicles, of a signal-actuating plunger carried by said wheel, a plurality of intersecting operating levers directly contacting with said plunger at their points of crossing same, a ring connecting the ends of said levers adjacent the inner periphery of the steering wheel, and yokes depending from said ring for yieldingly connecting the same to the spokes of the steering wheel.

5. The combination with a steering wheel for motor vehicles, of a centrally positioned signal-actuating plunger, intersecting operating levers which latter directly contact with said plunger at their points of intersection, an operating ring adjacent the inner periphery of the steering wheel and connecting the ends of said levers, and yokes depending from said ring for yieldingly and detachably connecting the latter to the spokes of a steering wheel.

In testimony whereof I affix my signature.

MICHAEL B. HOLSTEIN.